United States Patent [19]
Kozakai

[11] Patent Number: 5,478,907
[45] Date of Patent: Dec. 26, 1995

[54] ORGANOPOLYSILOXANE COMPOSITION AND OPTICAL FIBER COMPRISING A CORE OF A CURED PRODUCT OF THE COMPOSITION

[75] Inventor: Shouhei Kozakai, Annaka, Japan

[73] Assignee: Shin-Etsu Chemical Co., Ltd., Tokyo, Japan

[21] Appl. No.: 359,383

[22] Filed: Dec. 20, 1994

[30] Foreign Application Priority Data

Dec. 21, 1993 [JP] Japan ................. 5-345207

[51] Int. Cl.$^6$ .................................. C08G 77/08
[52] U.S. Cl. ................. 528/15; 428/391; 385/123
[58] Field of Search .................. 528/15; 428/391; 385/123

[56] References Cited

U.S. PATENT DOCUMENTS

| | | | |
|---|---|---|---|
| 4,849,491 | 7/1989 | Ogawa et al. | 528/15 |
| 5,244,733 | 9/1993 | Kozakai et al. | 428/391 |
| 5,264,522 | 11/1993 | Mize et al. | 528/15 |

FOREIGN PATENT DOCUMENTS

60-43613  3/1985  Japan.

*Primary Examiner*—Melvyn I. Marquis
*Attorney, Agent, or Firm*—Lowe, Price, LeBlanc & Becker

[57] ABSTRACT

An organopolysiloxane composition which is adapted for use as a core of plastic optical fibers comprises (A) an organopolysiloxane having a unit of the following general formula (1)

$$RSiO_{1.5} \quad (1)$$

wherein R represents a substituted or unsubstituted monovalent hydrocarbon, and also having not less than 0.05 alkenyl groups directly bonded to the silicon atom thereof per unit silicon atom, (B) an organosilicon compound of the following general formula (2)

$$(HSiO)_{\overline{a}} \overset{R_2^1}{\underset{R_{3-a}^1}{\mathrm{Si}}} - Q - \overset{R_2^1}{\underset{R_{3-a}^1}{\mathrm{Si}}} (OSiH)_a \quad (2)$$

wherein $R^1$'s independently represent a monovalent hydrocarbon group, Q represents a divalent aromatic hydrocarbon group, and a is an integer of from 1 to 3, and (C) a platinum catalyst for crosslinking between the organopolysiloxane and the organosilicon compound. An optical fiber comprising a core made of a cured product of the composition is also described.

15 Claims, 1 Drawing Sheet

ORGANOPOLYSILOXANE COMPOSITION AND OPTICAL FIBER COMPRISING A CORE OF A CURED PRODUCT OF THE COMPOSITION

BACKGROUND OF THE INVENTION

1. Field of The Invention

This invention relates to an organopolysiloxane composition which is adapted for use as a core material for plastic optical fibers. The invention also relates to a plastic optical fiber comprising a core made of a cured product of the composition.

2. Description of the Prior Art

As is well known in the art, optical fibers include, aside from glass optical fibers wherein quartz glass or multicomponent glasses are, respectively, used as a core component and also as a clad component, plastic optical fibers wherein both core and clad components are, respectively, made of plastics. The plastic optical fiber is disadvantageous in that it is greater in transmission loss than glass optical fibers, but with the advantage in that the plastic optical fiber is more likely to make a greater numerical aperture and is easier in handling and more inexpensive than glass optical fibers.

In usual practice, the plastic optical fiber is constituted of a core made of an organic polymer whose optical transparency is good and a clad made of an organic polymer whose refractive index is smaller than that of the core and which has a good transparency. Examples of the organic polymers which are suitable for use as a core material having good optical transmission include polymethyl methacrylate, polystyrene and the like. In recent years, organopolysiloxane elastomers have been proposed as a core material, for example, in Japanese Laid-open Patent Application No. 60-43613. The plastic optical fiber using the organopolysiloxane elastomer as the core is better in flexibility and heat resistance than the core component using polymethyl methacrylate.

However, where an organopolysiloxane elastomer is applied as a core material and is employed under moist heat conditions, water vapor is absorbed in the elastomer core although the heat resistance is good. Eventually, when the temperature is changed, the water vapor in the core is condensed, with the disadvantage that the optical transmission of the optical fiber considerably lowers. Thus, there arises the problem that limitation is placed on the use of the optical fiber.

In the field where a heat-resistant, plastic optical fiber is favorably employed, the optical fiber is essentially required to reliably work under high temperature and high humidity conditions. Hence, there is a demand for improving the moistureproofness of the plastic optical fiber.

SUMMARY OF THE INVENTION

It is accordingly an object of the invention to provide an organopolysiloxane composition which is suitable for use as a core material of plastic optical fibers and which is able to provide a cured core of the optical fiber which scarcely lowers in light transmission when used under high temperature and high humidity conditions and exhibits good moistureproofness.

It is another object of the invention to provide a plastic optical fiber comprising a core made of a cured product of the composition set out above.

The above objects can be achieved, according to one embodiment of the invention, by an organopolysiloxane composition which comprises:

(A) an organopolysiloxane comprising a unit of the following general formula (1)

$$RSiO_{1.5} \qquad (1)$$

wherein $R^1$'s represents a substituted or unsubstituted monovalent hydrocarbon group having from 1 to 10 carbon atoms, and having not less than 0.05 alkenyl groups directly bonded to the silicon atom thereof per unit silicon atom;

(B) an organosilicon compound of the following general formula (2)

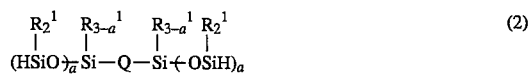

wherein $R^1$'s independently represent a monovalent hydrocarbon group, Q represents a divalent aromatic hydrocarbon group, and a is an integer of from 1 to 3; and (C) a platinum catalyst for crosslinking between the organopolysiloxane and the organosilicon compound.

In order to prevent an optical transmittance from decreasing under wet heat conditions, we conducted studies on an organopolysiloxane which is able to cure by addition reaction in the presence of a platinum catalyst. As a result, it was found that an organopolysiloxane composition comprising, prior to curing, a polysiloxane having an alkenyl group and an organosilicon compound serving as a crosslinking agent for addition and crosslinking reaction with the alkenyl group of the organopolysiloxane could remarkably suppress the lowering of the optical transmittance under wet heat conditions. The organopolysiloxane should have the three-dimensional structure constituting unit or units of the above formula (1) and having not less than 0.05 alkenyl groups, per unit silicon atom, directly bonded to the silicon atoms. The organosilicon compound is represented by the above formula (2) and should have a divalent aromatic group thereby forming a rigid structure and hydrogen atoms directly bonded to the silicon atoms.

According to another embodiment of the invention, there is also provided a plastic optical fiber which comprises a core and a plastic resin clad surrounding the core to permit an optical transmission through the core, the core consisting essentially of a cured product of the organopolysiloxane composition defined in claim 1.

DETAILED DESCRIPTION OF THE INVENTION

Figure 1:
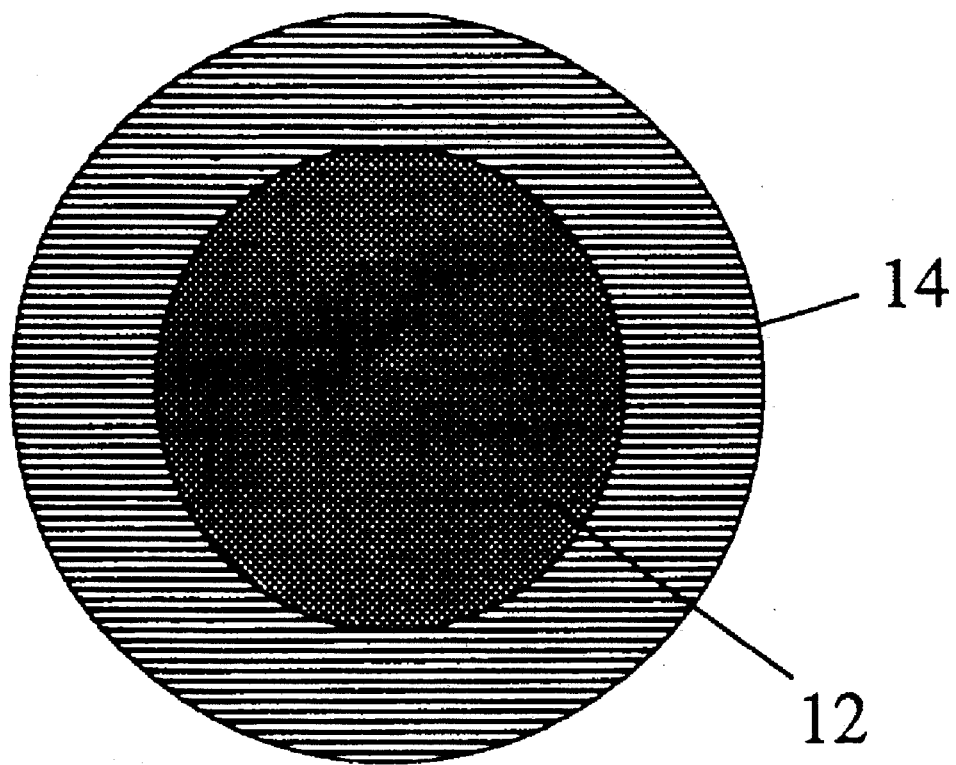
FIG. 1 is a schematic sectional view of a plastic optical fiber according to the invention.

The organopolysiloxane used as the ingredient (A) should comprise three-dimensional structure-constituting unit of the following formula (1) and an alkenyl group directly bonded to the silicon atoms $$RSiO_{1.5} \qquad (1)$$

In the above formula, R represents a substituted or unsubstituted monovalent hydrocarbon group having from 1 to 10 carbon atoms. Specific examples include an alkyl group such as a methyl group, an ethyl group, a propyl group or the like, an alkenyl group such as a vinyl group, an allyl group, a hexenyl group or the like, a cycloalkyl group such as a cyclohexyl group, an aryl group such as a phenyl group, a tolyl group, a xylyl group or the like, an aralkyl group such as a benzyl group, a phenylethyl group or the like, a halogen-substituted monovalent hydrocarbon group such as a tetrachlorophenyl group, a chlorophenyl group, a chloromethyl group, a pentafluorobutyl group, a trifluoropropyl group or the like. Of these, a methyl group, a phenyl group and a vinyl group are preferred. The ratio of these preferred groups is not critical. The unit of the formula (1) should preferably be present in an amount of from 30 to 80 mole %, more preferably from 40 to 70 mole %, in the organopolysiloxane (A).

The organopolysiloxane (A) is cured by addition crosslinking reaction with the organosilicon compound of the ingredient (B) through the hydrogen atoms directly joined to the silicon atoms of the ingredient (B) in the presence of a platinum catalyst of the ingredient (C). To this end, the alkenyl group, such as a vinyl group, an allyl group, an acryl group or the like, directly bonded to the silicon atoms of the organopolysiloxane (A) should be present not smaller in number than 0.05, preferably, not smaller than 0.15, per unit silicon atom thereof. If the number of the alkenyl group directly bonded to the silicon atom is smaller than 0.05, the curing speed may become low. In the worst case, any cured product cannot be obtained.

The units other than the unit of the formula (1) in the organopolysiloxane (A) include $R_2SiO$, $R_3SiO_{0.5}$ and $SiO_2$ units. The content ranges from 20 to 70 mole % for the $R_2SiO_2$ unit, from 0 to 20 mole % for the $R_3SiO_{0.5}$ unit and from 0 to 20 mole % for $SiO_2$ unit. In these formulas, R has the same meaning as defined above with respect to the formula (1).

The organopolysiloxanes (A) having the three-dimensional structure-constituting unit of the formula (1) and an alkenyl group include, for example, those of the following average compositional formulas:

$[MeSiO_{1.5}]_a[MeViSiO]_b$, $[PhSiO_{1.5}]_a[MeViSiO]_b$, $[PhSiO_{1.5}]_a[MeSiO_{1.5}]_b[MeViSiO]_c$, $[PhSiO_{1.5}]_a[ViSiO_{1.5}]_b[Me_2SiO]_c$, $[PhSiO_{1.5}]_a[MeViSiO]_b[MePhSiO]_c$, $[PhSiO_{1.5}]_a[MeViSiO]_b[Me_3SiO_{0.5}]_c[SiO_2]_d$, $[PhSiO_{1.5}]_a[MeViSiO_{1.5}]_b[ViMe_2SiO_{0.5}]_c[SiO_2]_d$, $[MeSiO_{1.5}]_a[MeViSiO]_b[HO_{0.5}]_c$, $[PhSiO_{1.5}]_a[MeViSiO]_b[HO_{0.5}]_c$, $[PhSiO_{1.5}]_a[MeSiO_{1.5}]_b[MeViSiO]_c[HO_{0.5}]_e$, $[PhSiO_{1.5}]_a[ViSiO_{1.5}]_b[Me_2SiO]_c[HO_{0.5}]_e$, $[PhSiO_{1.5}]_a[MeViSiO]_b[MePhSiO]_c[HO_{0.5}]_e$, $[PhSiO_{1.5}]_a[MeViSiO]_b[Me_3SiO_{0.5}]_c[SiO_2]_d[HO_{0.5}]_e$, and $[PhSiO_{1.5}]_a[MeViSiO]_b[ViMe_2SiO_{0.5}]_c[SiO_2]_d[HO_{0.5}]_e$ wherein each Me represents a methyl group, each Vi represents a vinyl group, each Ph represents a phenyl group, a to e are each a positive value smaller than 1 provided that the total of these values in the respective formulas is equal to 1.

These organopolysiloxanes are obtained by any known procedures wherein organosilanes and/or organoalkoxysilanes corresponding to the respective constituent units are subjected to co-hydrolysis.

The ingredient (B) is an organosilicon compound of the following formula (2) having hydrogen atoms directly bonded to the silicon atoms and undergoes an addition crosslinking reaction with the alkenyl group in the organopolysiloxane (A)

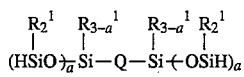

In the formula, $R^1$'s independently represent a monovalent hydrocarbon group preferably having from 1 to 10 carbon atoms, more preferably from 1 to 6 carbon atoms. Examples include an alkyl group such as a methyl group, an ethyl group, a propyl group or the like, an aryl group such as a phenyl group, a tolyl group, a xylyl group or the like, and aralkyl group such as a benzyl group, a phenylethyl group or the like. Of these, a methyl group and a phenyl group are preferred. More preferably, a methyl group is mentioned. Q represents a divalent aromatic hydrocarbon group preferably having from 6 to 20 carbon atoms, more preferably from 6 to 15 carbon atoms. These groups may contain a silicon atom or a siloxane bond at part of the structure thereof, and a is an integer of from 1 to 3.

Specific examples of the divalent aromatic hydrocarbon group include those represented by the following formulas

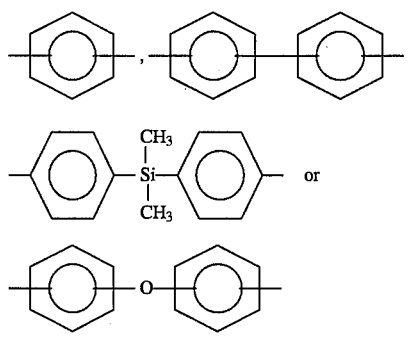

Examples of the organosilicon compound of the formula (2) include those having the following structures

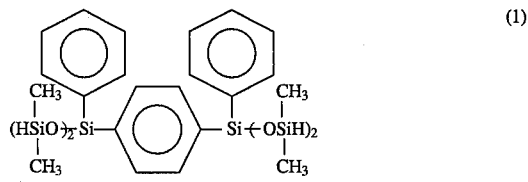

(1)

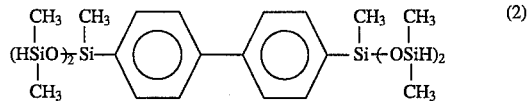

(2)

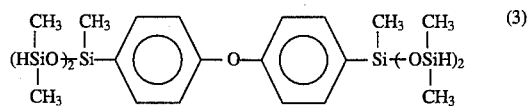

(3)

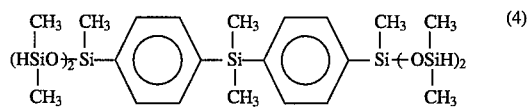

(4)

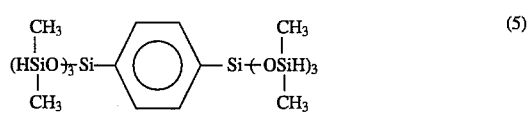

(5)

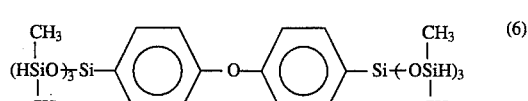

(6)

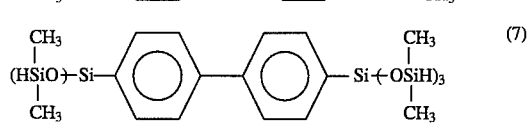

(7)

Preferably, the organosilicon compound is of the following formula (3)

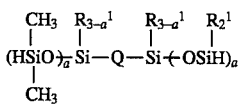 (3)

wherein $R^1$'s have, respectively, the same meaning as defined with respect to the formula (2). In this case, $R^1$'s are preferably a methyl or phenyl group and more preferably a methyl group. Q represents a divalent aromatic hydrocarbon group preferably having from 6 to 20 carbon atoms, more preferably from 6 to 15 carbon atoms.

The organosilicon compound should preferably be present in such an amount corresponding to 0.5 to 2 hydrogen atoms directly bonded to the silicon atoms of the compound (B) per unit alkenyl group of the organopolysiloxane (A), more preferably approximately one hydrogen atom per unit alkenyl group.

The platinum catalyst of the ingredient (C) is used to promote the formation of crosslinking bonds through the addition reaction between the silicon-bonded alkenyl group of the organopolysiloxane (A) and the silicon-bonded hydrogen atoms of the organosilicon compound (B), thereby shortening a time before completion of curing of the composition. The platinum catalysts include, for example, platinum black, chloroplatinic acid and the like. In order to permit the catalyst to dissolve in the organopolysiloxane, these compounds should preferably be used, for example, in the form of an alcohol-modified solution of chloroplatinic acid or a silicone-modified solution of chloroplatinic acid.

The platinum catalyst is used in a catalytic amount. Platinum brings about an optical transmission loss. Thus, a smaller amount is better. More particularly, the amount, calculated as platinum, should preferably be not larger than 5 ppm, more preferably not larger than 1 ppm, based on the total of the ingredients (A) and (B).

When the ingredients (A), (B) and (C) are mixed to obtain an organopolysiloxane composition which is adapted for use as a core of optical fibers, the addition reaction between the ingredients (A) and (B) proceeds in the vicinity of normal temperatures owing to the catalytic action of a platinum catalyst. This addition reaction proceeds very rapidly under heating conditions. In view of working conditions, a reaction inhibitor may be added so as to properly control the reaction speed. Examples of the inhibitor include, aside from acetylene alcohols, 3-methyl-3-butyn-2-ol, 2-methyl-1-pentyl-3-ol, 3,5-dimethyl-1-hexyn-3-ol, 2,5-dimethyl-3-hexyn-3,5-diol, 3,6-dimethyl-4-octyn-3,6-diol, 2,4,7,9-tetramethyl-5-decyn-4,7-diol and the like. The inhibitor is not critical with respect to its amount and should be properly selected depending on intended working conditions.

In the practice of the invention, the organopolysiloxane composition is readily formed into a core for optical fibers. More particularly, the essential ingredients are merely mixed and forced such as into tubes, followed by forming in the form of a fiber according to any known procedures and curing by heating to obtain a core for optical fibers. The curing conditions should preferably include a temperature of from 100° to 150° C. and a time of not shorter than 3 hours.

Reference is now made to FIG. 1 which schematically, sectionally shows a typical optical fiber indicated generally as 10. The fiber 10 is a so-called single-mode clad fiber and includes a core 12 and a clad 14 surrounding the core 12 therewith. The core 12 is made of a cured product of an organopolysiloxane composition in a manner as set out hereinabove. The clad be made of any known plastic resins which are ordinarily used for this purpose. Specific examples of the clad material include polytetrafluoroethylene, tetrafluoroethylene/perfluoroalkyl vinyl ether copolymers, tetrafluoroethylene/hexafluoroethylene copolymers, polychlorotrifluoroethylene, tetrafluoroethylene/ethylene copolymers, polyvinyl fluoride, polyvinylidene fluoride, tetrafluoroethylene/vinylidene fluoride copolymers, polyamide resins, polyimide resins, polyamide-imide resin, epoxy resins, polyester resins. As a matter of course, the composition of the invention may be applicable not only to the single-mode clad fiber, but also to multiple mode clad fiber and other types of optical fibers, if desired.

When using the core made of the cured product of the organopolysiloxane composition, the optical fiber does not exhibit an appreciable degree of optical transmission loss when exposed to high temperature and high humidity conditions. In addition, a high optical transmittance is maintained under temperature and humidity-varying conditions, ensuring high reliability.

Thus, the plastic optical fiber of the invention has good moistureproofness along with its inherent high heat resistance, with the possibility of extending the range of application of the plastic optical fiber.

The invention is more particularly described by way of examples, which should not be construed as limiting the invention thereto. Comparative examples are also shown. In these examples and comparative examples, parts are by weight and Me represents a methyl group and Vi represents a vinyl group.

EXAMPLE 1

100 parts of a vinyl group-containing organopolysiloxane of the following average compositional formula (4) and 28.71 parts by weight of an organosilicon compound of the following formula (5) were mixed

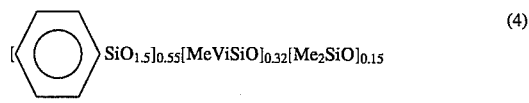 (4)

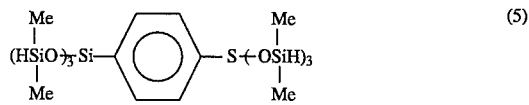 (5)

An octyl alcohol-modified solution of chloroplatinic acid was added to the mixture in an amount of 1 ppm, calculated as Pt, based on the weight of the mixture thereby preparing organopolysiloxane composition A.

EXAMPLE 2

The general procedure of Example 1 was repeated except that 43.3 parts of an organosilicon compounds of the following formula (6) was used instead of the compound of the formula (5), thereby preparing organopolysiloxane composition B

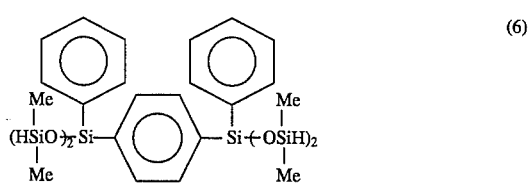 (6)

EXAMPLE 3

The general procedure of Example 1 was repeated except that 40.9 parts of an organosilicon compounds of the following formula (7) was used instead of the compound of the formula (4), thereby preparing organopolysiloxane composition C

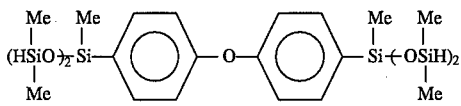  (7)

EXAMPLE 4

The general procedure of Example 1 was repeated except that 44.07 parts of an organosilicon compounds of the following formula (8) was used instead of the compound of the formula (4), thereby preparing organopolysiloxane composition D

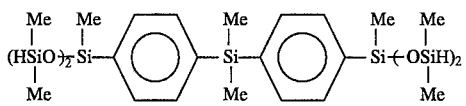  (8)

COMPARATIVE EXAMPLE 1

The general procedure of Example 1 was repeated except that 32.5 parts of organohydrogenpolysiloxane of the following formula (9) was used instead of the formula (4), thereby preparing organopolysiloxane composition E

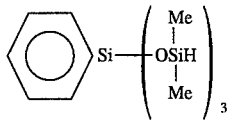  (9)

COMPARATIVE EXAMPLE 2

100 parts of dimethylpolysiloxane blocked at both ends thereof with a dimethylvinylsiloxy group and having a viscosity of 50 centistokes at 25° C. and 14.3 parts of methylhydrogenpolysiloxane of the following formula (10) having three or more hydrogen atoms were mixed to prepare organopolysiloxane composition F in the same manner as in Example 1

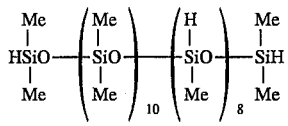  (10)

The organopolysiloxane compositions A to F were each subjected to filtration through a membrane filter and forced into a fluorine resin tube having an inner diameter of 1.5 mm and an outer diameter of 2.2 mm, followed by heating for curing under conditions of 110° C. for 6 hours and then under conditions of 150° C. for 16 hours to obtain six types of optical fibers. These optical fibers were, respectively, exposed to high humidity conditions and high temperature conditions, followed by measurement of a light quantity by use of light at a wavelength of 660 nm prior to and after the exposure to determine a variation in the light quantity (or a retention of light quantity).

The retention of light quantity was measured as follows: a 1 meter long optical fiber was exposed to environmental conditions of 60° C. and 90 R.H. % and also to conditions of 150° C. for 1000 hours, respectively, followed by allowing to stand at room temperature for 2 hours and measurement of a quantity of light.

The results are shown in Table 1 below.

TABLE 1

| | Organopolysiloxane composition for core | Light Retention | | |
|---|---|---|---|---|
| | | Immediately after formation of core | After exposure to conditions of 60° C., 90% and 1000 hours | After exposure to conditions of 150° C. and 1000 hours |
| Example 1 | A | 100 | 68 | 98 |
| Example 2 | B | 100 | 71 | 98 |
| Example 3 | C | 100 | 87 | 97 |
| Example 4 | D | 100 | 83 | 98 |
| Comparative Example 1 | E | 100 | 0 | 99 |
| Comparative Example 2 | F | 100 | 0 | 98 |

As will be apparent from the results of the above table, the cores of the examples of the invention are much better in the high temperature and high humidity conditions than those cores of the comparative examples.

What is claimed is:

1. An organopolysiloxane composition which comprises:
(A) an organopolysiloxane having a unit of the following general formula (1)

$$RSiO_{1.5}$$ (1)

wherein R represents a substituted or unsubstituted monovalent hydrocarbon group having from 1 to 10 carbon atoms, and also having not less than 0.05 alkenyl groups directly bonded to the silicon atom thereof per unit silicon atom;

(B) an organosilicon compound of the following general formula (2)

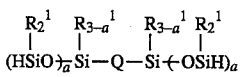   (2)

wherein $R^1$'s independently represent a monovalent hydrocarbon group, Q represents a divalent aromatic hydrocarbon group, or a divalent aromatic hydrocarbon group containing a diphenyl ether oxygen, a silicon atom or one or more siloxane bonds and a is an integer of from 1 to 3; and (C) a platinum catalyst for crosslinking between the organopolysiloxane and the organosilicon compound.

2. An organopolysiloxane composition according to claim 1, wherein said unit is present in an amount of from 30 to 80 mole % in said organopolysiloxane.

3. An organopolysiloxane composition according to claim 1, wherein said units have not less than 1.5 an alkenyl groups directly bonded to the silicon atoms of said organopolysiloxane per unit silicon atom.

4. An organopolysiloxane composition according to claim 1, wherein said organopolysiloxane comprises from 20 to 70 mole % of $R_2SiO$ unit, up to 20 mole % of $R_3SiO_{0.5}$ unit and up to 20 mole % of $SiO_2$ unit wherein each R has the same meaning as defined before.

5. An organopolysiloxane composition according to claim 1, wherein the monovalent hydrocarbon group represented by $R^1$ in the formula (2) has from 1 to 10 carbon atoms.

6. An organopolysiloxane composition according to claim 5, wherein said monovalent hydrocarbon group is a methyl group.

7. An organopolysiloxane composition according to claim 5, wherein said monovalent hydrocarbon group is a phenyl group.

8. An organopolysiloxane composition according to claim 1, wherein the group represented by Q in the formula (2) has from 6 to 20 carbon atoms and optionally contains one or more siloxane bonds therein.

9. An organopolysiloxane composition according to claim 8, wherein said Q represents a group selected from the groups of the following formulas

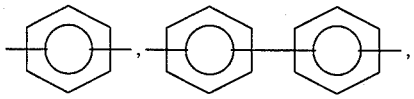

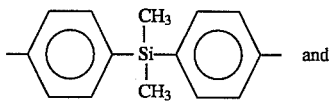

and

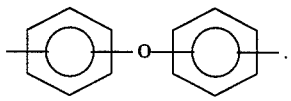

10. An organopolysiloxane composition according to claim 1, wherein said organosilicon compound is of the following general formula (3)

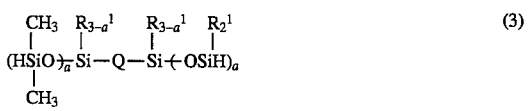   (3)

wherein $R^1$'s have, respectively, the same meaning as defined in claim 1.

11. An organopolysiloxane composition according to claim 10, wherein $R^1$'s independently represent a methyl group.

12. An organopolysiloxane composition according to claim 10, wherein the group represented by Q in the formula (3) has from 6 to 20 carbon atoms optionally with one or more siloxane bonds being present therein.

13. An organopolysiloxane composition according to claim 1, wherein said organosilicon compound is present in such an amount that 0.5 to 2 hydrogen atoms directly bonded to the silicon atoms of said organosilicon atom are contained per unit alkenyl group of said organopolysiloxane.

14. An optical fiber which comprises a core consisting of a cured product of said organopolysiloxane composition defined in claim 1.

15. An optical fiber according to claim 14, further comprising a clad surrounding said core therewith whereby a single mode clad optical fiber is obtained.

* * * * *